March 5, 1957  M. L. DUBBE  2,784,036
WEIGHT FOR A VEHICLE WHEEL
Filed April 8, 1953

INVENTOR.
Maynard L. Dubbe
BY Victor J. Evans & Co.
ATTORNEYS

United States Patent Office 2,784,036
Patented Mar. 5, 1957

2,784,036
WEIGHT FOR A VEHICLE WHEEL

Maynard L. Dubbe, Hartford, S. Dak.

Application April 8, 1953, Serial No. 347,579

3 Claims. (Cl. 301—41)

This invention relates to a vehicle wheel, and more particularly to a weight for a vehicle wheel.

The object of the invention is to provide a wheel weight for a vehicle such as a tractor or truck whereby greater traction can be provided as when a heavy load is being pulled.

Another object of the invention is to provide a wheel weight which is adapted to be detachably mounted on a tractor, truck or other vehicle wheel, the weight of the present invention adapted to fit wheels of various sizes wherein the traction of the vehicle will be improved, the wheel weight being constructed so that there will be no interference with normal use of the tire.

A further object of the invention is to provide a wheel weight which is extremely simple and inexpensive to manufacture.

Other objects and advantages will be apparent during the course of the following description.

In the accompanying drawings, forming a part of this application, and in which like numerals are used to designate like parts throughout the same:

Figure 1:
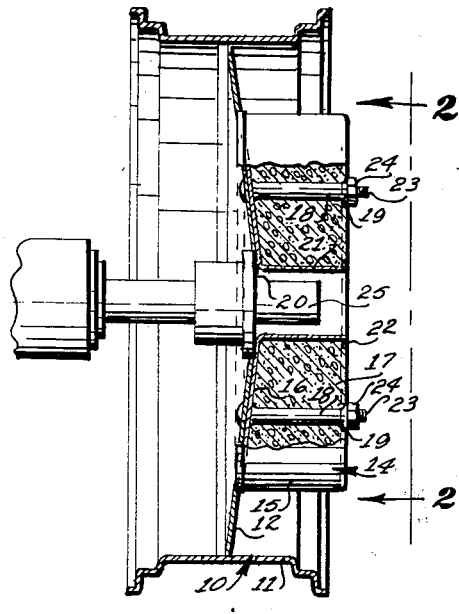
Figure 1 is a side elevational view showing the wheel weight of the present invention attached to a wheel, and with parts broken away and in section.
Figure 2:
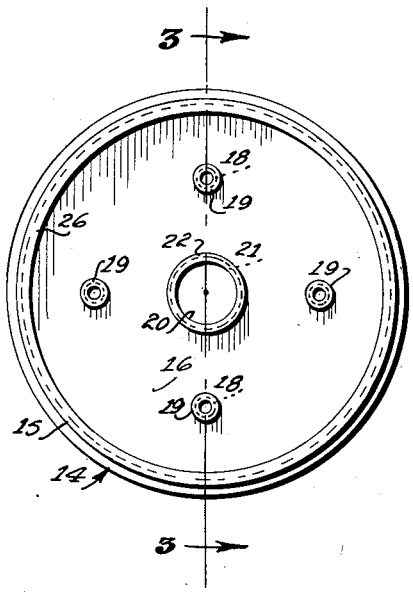
Figure 2 is a sectional view taken on the line 2—2 of Figure 1.
Figure 3:
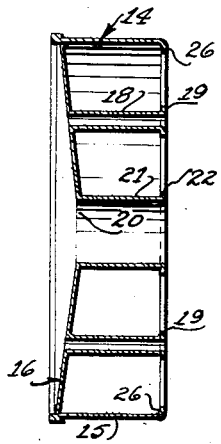
Figure 3 is a sectional view taken on the line 3—3 of Figure 2.

Referring in detail to the drawings, the numeral 10 designates a wheel which may be the wheel of a tractor or truck, and the wheel 10 includes an annular rim 11 which has a central web 12 secured thereto. Partitioned within the rim 10 is a casing or housing 14 which may be fabricated of any suitable material such as metal. The casing 14 includes an annular flange 15 and a back wall 16, Figure 3. Positioned within the casing 14 is a body or mass of concrete 17 whereby the wheel 10 will be provided with sufficient traction or weight to enable the vehicle to operate efficiently even though it may be pulling a heavy load through a muddy street or road.

Extending from the back wall 16 and secured thereto is a plurality of hollow sleeves 18, and the end of each of the sleeves 18 is turned or bent transversely as at 19 so as to provide a means for helping to prevent accidental disengagement of the concrete mass 17 from the casing 14. The back wall 16 is further provided with a central opening 20 whereby the usual vehicle axle 25 can project therethrough. Surrounding the opening 20 is an annular collar 21 which also has a bent lip portion 22 for helping to maintain the concrete 17 in the casing 14. For securing the casing 14 to the wheel 10, a plurality of securing elements such as bolts 23 extend through the web 12 and through the sleeves 18, and suitable nuts 24 are arranged in threaded engagement with the bolts 23. It will also be seen that the annular flange 15 also has its outer portion turned inwardly as at 26 to help grip and retain the concrete body 17 in place.

From the foregoing, it is apparent that a wheel weight has been provided which will improve the efficiency of wheels for vehicles such as tractors, trucks and the like. The wheel weight includes the casing 14 which has the concrete mass or body 17 secured therein, and the casing 14 can be detached from the wheel 10 when desired. To detach or remove the casing 14 from the wheel 10, it is only necessary to remove the nuts 24 so that the casing 14 can be removed. Thus, various sizes of casings 14 can be attached to the wheels depending upon the conditions under which the vehicle is being used. The wheel weight of the present invention will fit various types or sizes of tractors and the like. Weight of the concrete body 17 may be approximately 200 or more pounds.

I claim:

1. A weighted tractor wheel comprising an annular rim, a web arranged centrally of said rim and secured thereto, a casing positioned within said rim and including a back wall arranged contiguous to said web, an annular flange extending outwardly from said back wall, a plurality of spaced parallel hollow sleeves extending from said back wall, the ends of said sleeves and flange being bent transversely, and a body of concrete positioned within said casing, and securing elements extending through said web and through said sleeves, there being a central opening in said back wall for the projection therethrough of an axle, and an annular collar secured to said back wall and surrounding said opening.

2. In a weighted tractor wheel, an annular rim, a web arranged centrally of said rim and secured thereto, a casing positioned within said rim and including a back wall arranged contiguous to said web, an annular flange extending outwardly from said back wall, a plurality of spaced parallel hollow sleeves extending from said back wall, the ends of said sleeves and flange being bent transversely, a body of concrete positioned within said casing, securing elements extending through said web and through said sleeves, there being a central opening in said back wall for the projection therethrough of an axle, an annular collar secured to said back wall and surrounding said opening, said back wall being shaped concavely whereby its central portion is spaced inwardly and the length of said collar is less than the length of said sleeves, the diameter of said collar being greater than the diameter of said sleeves, the outer end of said casing projecting beyond the outer end of said rim.

3. A weighted tractor wheel comprising an annular rim, a web arranged centrally of said rim and secured thereto, said web being shaped concavely so that its central portion is dished outwardly, a casing positioned within said rim and including a back wall arranged contiguous to said web, said back wall being shaped concavely so that its central portion is dished outwardly, an annular flange extending outwardly from said back wall, said flange having a smaller diameter than said rim, a plurality of spaced parallel hollow cylindrical sleeves extending from said back wall, the ends of said sleeves and flange being bent transversely, a cylindrical body of concrete positioned within said casing, a plurality of spaced parallel securing elements extending through said web and through said sleeves, there being a central opening in said back wall for the projection therethrough of an axle, an annular collar secured to said back wall and surrounding said opening, the length of said collar being less than the length of said sleeves, the diameter of said collar being greater than the diameter of said sleeves, the outer end of said casing projecting beyond the outer end of said rim, the outer ends of said flange and sleeves lying in the same plane.

References Cited in the file of this patent

UNITED STATES PATENTS

| 1,487,257 | Mansfield | Mar. 18, 1924 |
| 2,123,861 | Shields | July 12, 1938 |
| 2,243,380 | Kinney | May 27, 1941 |